(12) United States Patent
Malhotra et al.

(10) Patent No.: US 10,397,182 B1
(45) Date of Patent: Aug. 27, 2019

(54) METHOD AND PROCEDURE TO IDENTIFY A SOURCE ACROSS A NETWORK ADDRESS TRANSLATION DEVICE

(71) Applicant: SPRINT COMMUNICATIONS COMPANY L.P., Overland Park, KS (US)

(72) Inventors: Rajil Malhotra, Olathe, KS (US); Chidambaram C. Pavanasam, Overland Park, KS (US); Badri Prasad Subramanyan, Overland Park, KS (US); Anubhav Visen, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 402 days.

(21) Appl. No.: 15/080,071

(22) Filed: Mar. 24, 2016

(51) Int. Cl.
*G06F 13/00* (2006.01)
*H04L 29/12* (2006.01)
*H04L 29/06* (2006.01)

(52) U.S. Cl.
CPC ........ *H04L 61/251* (2013.01); *H04L 65/1069* (2013.01)

(58) Field of Classification Search
CPC .... H04W 8/26; H04L 29/1233; H04L 61/251; H04L 65/1069
USPC .......................................... 709/245, 227–229
See application file for complete search history.

(56) References Cited

U.S. PATENT DOCUMENTS

| 8,549,155 | B2 * | 10/2013 | Skog | H04L 12/2818 709/228 |
| 8,700,784 | B2 * | 4/2014 | Skog | H04L 12/2818 709/228 |
| 2010/0070636 | A1 * | 3/2010 | Skog | H04L 12/2818 709/228 |
| 2012/0265889 | A1 * | 10/2012 | Skog | H04L 12/2818 709/228 |
| 2013/0227170 | A1 * | 8/2013 | Zha | H04L 61/2582 709/245 |
| 2017/0353429 | A1 * | 12/2017 | Le Rouzic | H04L 61/2564 |

* cited by examiner

*Primary Examiner* — Kenneth R Coulter

(57) ABSTRACT

Methods and systems are provided for identifying, to an external device, a client device having an external IP address assigned by a Network Address Translation (NAT) device. Initially, the NAT device provides an external IP address assigned to a client device to access an external device. Upon the client device communicating with the external device, the NAT device also provides an internal IP address assigned to the client device in an option field of the external IP address. If the external device later requests to communicate with the client device, and includes in the request the internal IP address in the option field of the external IP address assigned to the client device, the NAT device checks for sessions mapping to the client device. Upon determining there are no sessions mapped to the client device, a new connection is opened to the client device utilizing the internal IP address.

16 Claims, 6 Drawing Sheets

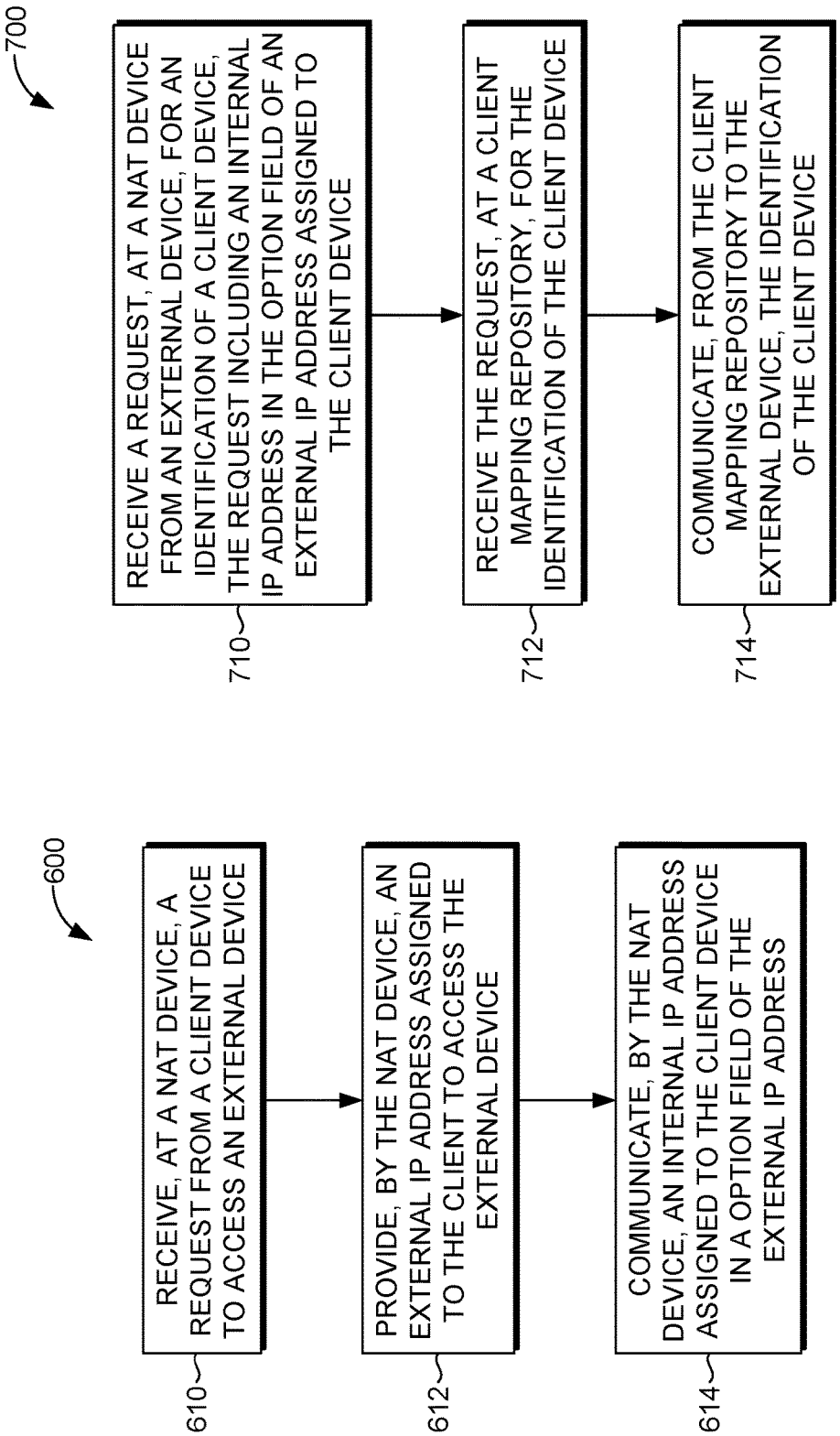

US 10,397,182 B1

METHOD AND PROCEDURE TO IDENTIFY A SOURCE ACROSS A NETWORK ADDRESS TRANSLATION DEVICE

SUMMARY

A high-level overview of various aspects of the invention is provided here for that reason, to provide an overview of the disclosure and to introduce a selection of concepts that are further described below in the detailed description section below. This summary is not intended to identify key features or essential features of the claimed subject matter, nor is it intended to be used as an aid in isolation to determine the scope of the claimed subject matter.

In brief, and at a high level, this disclosure describes, among other things, systems and methods for identifying a source across a network address translation device. For example, network address translation (NAT) has been used to conserve internet protocol (IP) addresses. In aspects herein, the original (internal) source IP information for a client device is communicated in an option field of the external IP address (NAT IP). When a client device communicates with an external server, the external server uses the internal IP address in the option field to identify the session and all future sessions from the client device. In instances where the external IP address changes, the internal IP address remains the same and the external server is still able to identify the session. Similarly, when the external device wishes to contact the client device, a connection to the NAT IP is initiated. The internal IP address is included in the option field and the NAT device checks for any sessions mapping to the connection. If no connection exists, a new connection is opened to the client. This enables an external server to receive and initiate communications for client devices where NAT IP addresses might otherwise prevent the proper identification of the client device. Consequently, the external server is able to customize sessions for users based on this identification.

BRIEF DESCRIPTION OF THE DRAWINGS

Illustrative embodiments of the present invention are described in detail below with reference to the attached drawing figures, and wherein:

FIGS. 6-7 depict flow charts of exemplary methods of identifying, to an external device, a client having an external IP addressed assigned by a NAT device, in accordance with aspects described herein.

DETAILED DESCRIPTION

Figure 1:
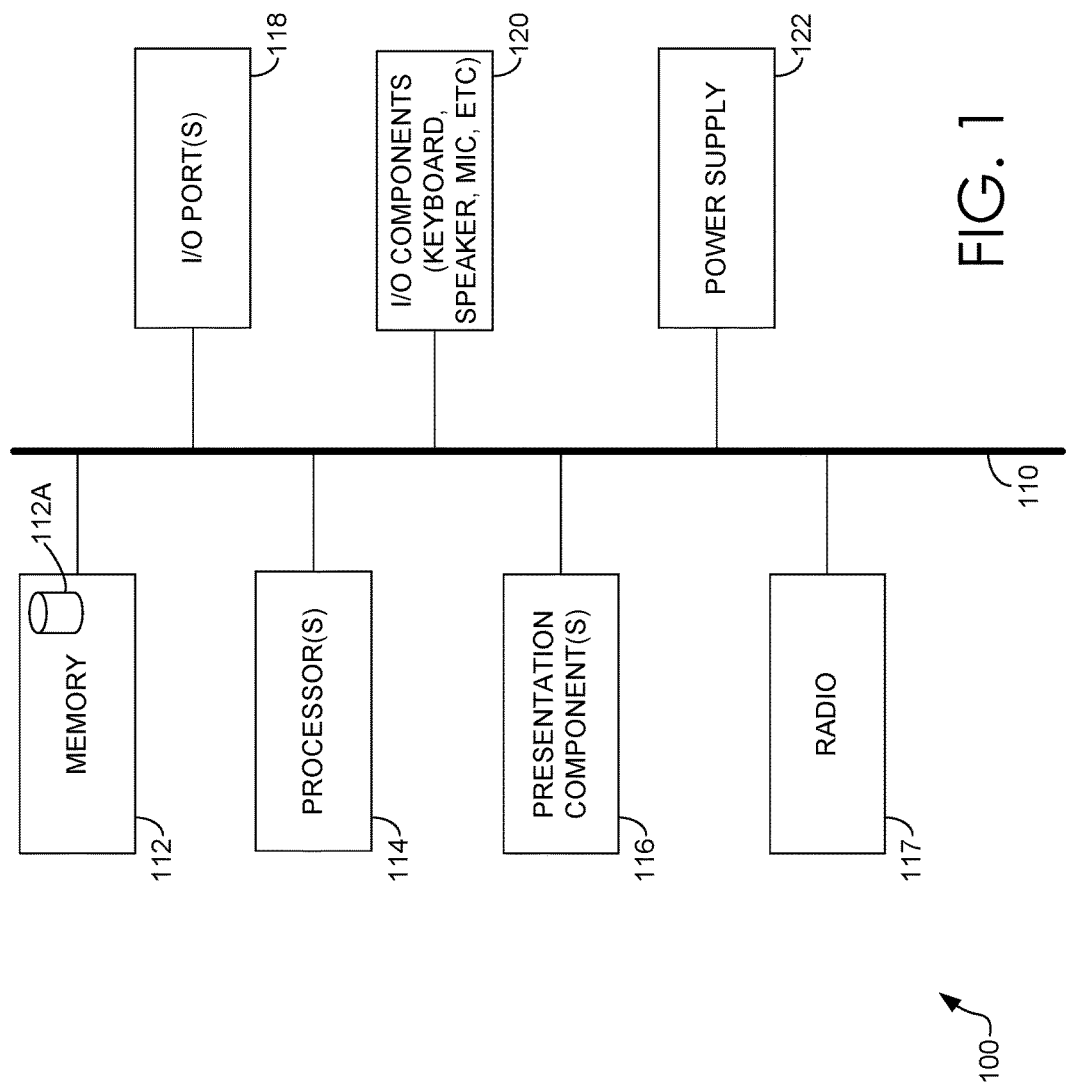
FIG. 1 depicts an exemplary mobile device according to an embodiment of the technology.

The subject matter of select embodiments of the present invention is described with specificity herein to meet statutory requirements. But the description itself is not intended to define what we regard as our invention, which is what the claims do. The claimed subject matter might be embodied in other ways to include different steps or combinations of steps similar to the ones described in this document, in conjunction with other present or future technologies. Terms should not be interpreted as implying any particular order among or between various steps herein disclosed unless and except when the order of individual steps is explicitly described.

Throughout this disclosure, several acronyms and shorthand notations are used to aid the understanding of certain concepts pertaining to the associated system and services. These acronyms and shorthand notations are intended to help provide an easy methodology of communicating the ideas expressed herein and are not meant to limit the scope of the present invention. The following is a list of these acronyms:

AMBR Aggregate Maximum Bit Rate
APN Access Point Name
BS Base Station
CDMA Code Division Multiple Access
DNS Domain Name System
eNodeB Evolved Node B
GPRS General Packet Radio Service
GSM Global System for Mobile Communications
IP Internet Protocol
IPv4 Internet Protocol Version 4
IPv6 Internet Protocol Version 6
LTE Long-Term Evolution
PDN Packet Data Network
PGW PDN Gateway
QoS Quality of Service
WCDMA Wideband Code Division Multiple Access Further, various technical terms are used throughout this description. An illustrative resource that fleshes out various aspects of these terms can be found in Newton's Telecom Dictionary, 27th Edition (2012).

Embodiments of our technology may be embodied as, among other things, a method, system, or computer-program product. Accordingly, the embodiments may take the form of a hardware embodiment, or an embodiment combining software and hardware. In one embodiment, the present invention takes the form of a computer-program product that includes computer-useable instructions embodied on one or more computer-readable media.

Computer-readable media include both volatile and non-volatile media, removable and non-removable media, and contemplate media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

Aspects of the present invention are directed towards identifying a source across a network address translation device. As mentioned above, network address translation has been used to conserve internet protocol addresses. However, when an external server uses the external IP address (the NAT IP) to identify a client, the original (internal) source IP information for the client is unknown. In situations of packet failure, for instance, the packet might get routed to a different NAT device. This results in a different NAT IP being assigned thereby causing the external server to lose the ability to relate the two sessions. Additionally, if the external server wishes to initiate a session to the client, the external server is unable to do so because the NAT device is not aware of the proper session to map the connection.

In aspects herein, the original (internal) source IP information for a client device is communicated in an option field of the external IP address (NAT IP). When a client device communicates with an external server, the external server uses the internal IP address in the option field to identify the session and all future sessions from the client device. In instances where the external IP address changes, the internal IP address remains the same and the external server is still able to identify the session. Similarly, when the external device wishes to contact the client device, a connection to the NAT IP is initiated. The internal IP address is included in the option field and the NAT device checks for any sessions mapping to the connection. If no connection exists, a new connection is opened to the client. This enables an external server to receive and initiate communications for client devices where NAT IP addresses might otherwise prevent the proper identification of the client device. Consequently, the external server is able to customize sessions for users based on this identification.

Accordingly, in a first aspect, a computerized method carried out by at least one server having one or more processors for identifying, to an external device, a client device having an external IP address assigned by a Network Address Translation (NAT) device. The method comprises receiving, at a NAT device, a request from a client device to access an external device. The method also comprises providing, by the NAT device, an external IP address assigned to the client to access the external device. The method further comprises communicating, by the NAT device, an internal IP address assigned to the client device in an option field of the external IP address.

In a second aspect, one or more computer-storage media are provided having computer-executable instructions embodied thereon that, when executed, perform a method for identifying, to an external device, a client device having an external IP address assigned by a Network Address Translation (NAT) device. The method comprises receiving a request, at a NAT device in a wireless communications network, from an external device, for an identification of a client device, the request including an internal IP address in the option field of an external IP address assigned to the client device. The method also comprises receiving the request, at a client mapping repository in the wireless communications network, for the identification of the client device. The method further comprises communicating, from the client mapping repository to the external device, the identification of the client device.

In a third aspect, a system is provided for identifying, to an external device, a client device having an external IP address assigned by a Network Address Translation (NAT) device. The system includes a processor and one or more computer-readable media storing computer-useable instructions that, when used by the processor, cause the processor to provide, by the NAT device, an external IP address assigned to a client device to access an external device; upon the client device communicating, with the external device, provide by the NAT device, an internal IP address assigned to the client device in an option field of the external IP address; upon receiving a request from the external device to communicate with the client device, the request including the internal IP address in the option field of the external IP address assigned to the client device, checking for any sessions at the NAT device mapping to the client device; and upon determining there are no sessions mapped to the client device, opening a new connection to the client device.

Referring to the drawings in general, and initially to FIG. 1 in particular, a block diagram of an illustrative mobile device according to one embodiment is provided and referenced generally by the numeral 100. Although some components are shown in the singular, they may be plural. For example, the user device 100 might include multiple processors or multiple radios, etc. As illustratively shown, the user device 100 includes a bus 110 that directly or indirectly couples various components together, including memory 112, a processor 114, a presentation component 116, a radio 117 (if applicable), input/output ports 118, input/output components 120, and a power supply 122.

Memory 112 might take the form of memory components previously described. Thus, further elaboration will not be provided here, only to say that the memory component 112 can include any type of medium that is capable of storing information (e.g., a database). A database can be any collection of records. In one embodiment, memory 112 includes a set of embodied computer-executable instructions 112A that, when executed, facilitate various aspects disclosed herein. These embodied instructions will variously be referred to as "instructions" or an "application" for short.

The processor 114 might actually be multiple processors that receive instructions and process them accordingly. The presentation component 116 includes the likes of a display, a speaker, as well as other components that can present information (such as a lamp (LED), or even lighted keyboards).

Numeral 117 represents a radio(s) or antenna that facilitates communication with a wireless telecommunications network including, for example, a base station or eNodeB associated with the wireless telecommunications network. Illustrative wireless-telecommunications technologies include CDMA, GPRS, TDMA, GSM, and the like. The radio/antenna 117 might additionally or alternatively facilitate other types of wireless communications including Wi-Fi, WiMAX, LTE, or other VoIP communications. As can be appreciated, in various embodiments, the radio/antenna 117 can be configured to support multiple technologies, and/or multiple radios/antennas can be utilized to support multiple technologies.

The input/output port 118 might take on a variety of forms. Illustrative input/output ports include a USB jack, stereo jack, infrared port, proprietary communications ports, and the like. The input/output components 120 include items such as keyboards, microphones, speakers, touch screens, and any other item usable to directly or indirectly input data into the user device 100. The power supply 122 includes items such as batteries, fuel cells, or any other component that can act as a power source to power the user device 100.

Figure 2:
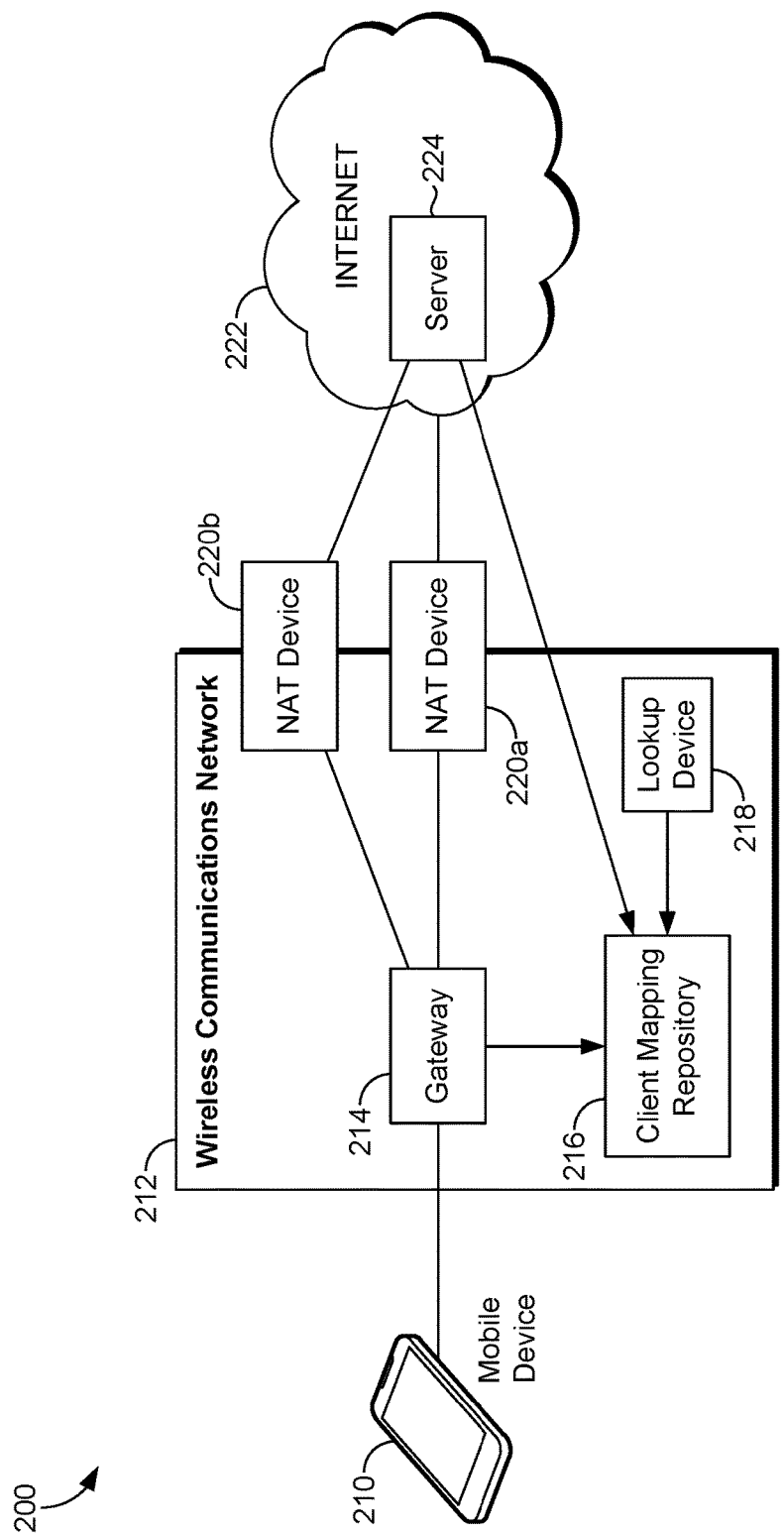
FIG. 2 is a schematic view of an exemplary network environment suitable for performing aspects described herein.

Turning to FIG. 2, an illustrative operating system is depicted for use in practicing an embodiment of the technology, and is generally referred to herein as environment 200. Environment 200 is but one example of a suitable environment and is not intended to suggest any limitation as to the scope of use or functionality of embodiments herein. Neither should the environment be interpreted as having any dependency or requirement relating to any one or combination of components illustrated.

In the environment 200, a client device 210 (e.g., a mobile device) is illustrated and able to communicate with other devices (e.g., a mobile device(s), a server(s), a personal computer(s), etc.), by way of a wireless communications network 212. The wireless communications network 212 might include an array of devices or components, some of which are not shown so as not to obscure more relevant aspects of the invention. Components of environment 200 that may be part of the network 212 may include the gateway 214, the client mapping repository 216, lookup device 218, and NAT devices 220a, 220b. Components such as terminals, links, and nodes (as well as other components) can provide connectivity in some embodiments. The network 212 can include multiple networks, as well as being a network of networks. The network 212 can be part of a telecommunications network that connects subscribers or users to their immediate service provider. In embodiments, the network 212 can be associated with a telecommunications provider that provides services to mobile devices, such as mobile device 210. For example, the network 212 may provide voice and/or data services to mobile devices or corresponding users that are registered to utilize the services provided by a telecommunications provider. The network 212 can be any communications network providing voice and/or data service(s), such as, for example, a 1× circuit voice, a 3G network (e.g., CDMA, CDMA2000, WCDMA, GSM, UMTS), or a 4G network (WiMAX, LTE, HSDPA).

While a single client device 210 (e.g., the mobile device) is illustrated in environment 200, it should be understood that any number of client devices may communicate by way of a wireless communications network 212. For instance, in some geographical areas, some wireless communications networks may serve large quantities of user devices, while in other areas, wireless communications networks may serve smaller quantities of user devices. As such, the quantity of user devices illustrated in environment 200 is shown just for exemplary purposes, and is not meant to limit embodiments presented herein in any way.

A client device, as used herein, is a device that has the capability of using a wireless communications network. A user device may take on a variety of forms, such as a personal computer (PC), a laptop computer, a tablet, a mobile phone, a personal digital assistant (PDA), a server, or any other device that is capable of communicating with other devices using a wireless telecommunications network. In one embodiment, a client device is the device described in relation to FIG. 1 herein.

The gateway 214 is the link between the client devices and access to servers, such as server 224 by way of the Internet 222. In one embodiment, the gateway 214 is a packet data network (PDN) gateway (P-GW). The gateway 214 may be responsible for allocating various user device parameters to the client devices during the authentication process. Additionally, the client devices may be connected to multiple network gateways, instead of just one, as shown in FIG. 2. In aspects described herein, the network gateway 214 assists with the authentication process, as well as when a client device requests to access content from a website.

In aspects described herein, the network gateway 214 is the component that assigns or allocates various parameters to client devices during authentication of those user devices onto the network. As will be described further herein, the network gateway 214 utilizes logic that allows it to determine, for example, which NAT device to assign to a particular client device. In part, this assignment is based on the IP version capabilities of the client device. In an embodiment, requests from a client device 210 are sent through the network gateway 214 and when an external IP address is needed, the request is routed to one or more of the NAT device(s) 220a, 220b.

NAT device(s) 220a, 220b generally provide firewall services to the wireless communications network. In this way outgoing communications from the wireless communications network and incoming communications to the wireless communications network are allowed or rejected by the NAT device(s) 220a, 220b. For example, when a client device 210 attempts to communicate with a server 224, gateway 214 may assign an internal IP address to the client device 210. In order to communicate outside the wireless communications network 212, such as with server 224, NAT device(s) 220a, 220b provide an external IP address (i.e., a NAT address) to the client device. Additionally, upon the client device communicating with the external device, the internal IP address assigned to the client device is communicated in an option field of the external IP address.

When a request to communicate with the client device is received from the external device, the NAT device(s) 220a, 220b initially checks for any existing sessions mapping to the client device. Because the request also includes the internal IP address in the option field of the external IP address assigned to the client device, if no sessions are currently mapped to the client device, a new connection is opened to the client device.

To do so, the internal IP address may be communicated to a lookup device 218 and/or a client mapping repository 216. The lookup device 218 and/or client mapping repository 216 maps client devices to their respective internal IP addresses. This enables the external devices (e.g., a server) to maintain the ability to initiate communication and/or identify a client device even when the client device communicates with a NAT IP address for external communication.

Figure 3:
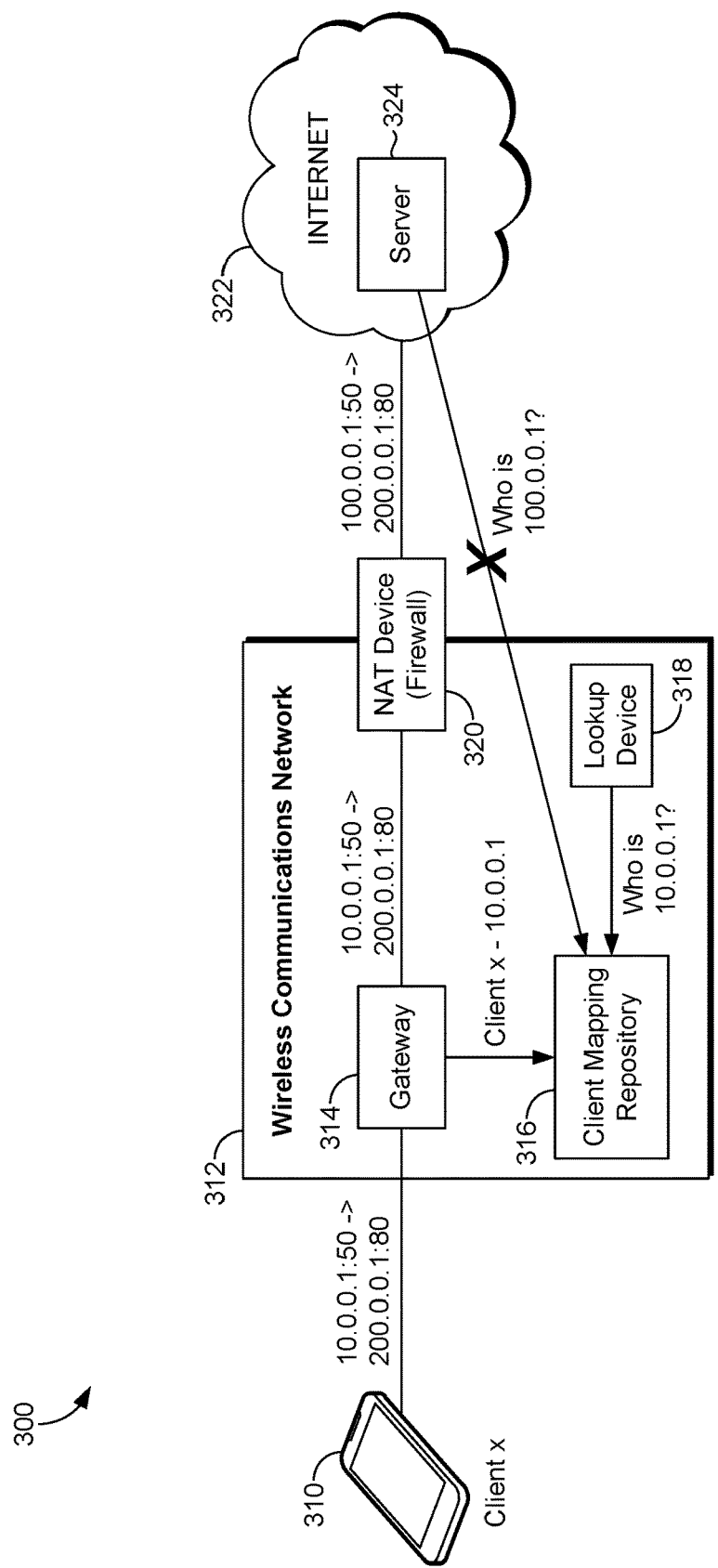
FIGS. 3-5 are diagrams depicting exemplary communication flows, in accordance with aspects described herein.
Figure 4:
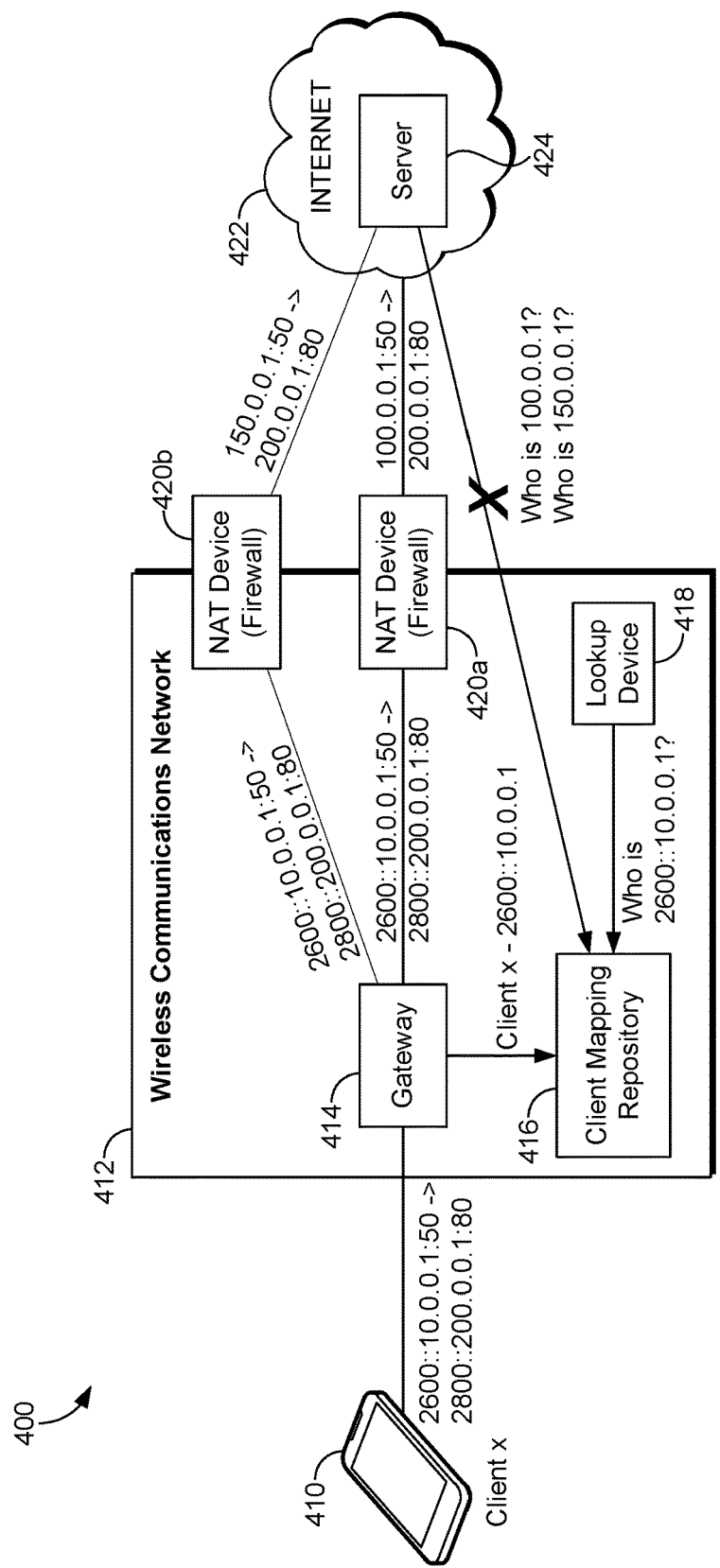
Figure 5:
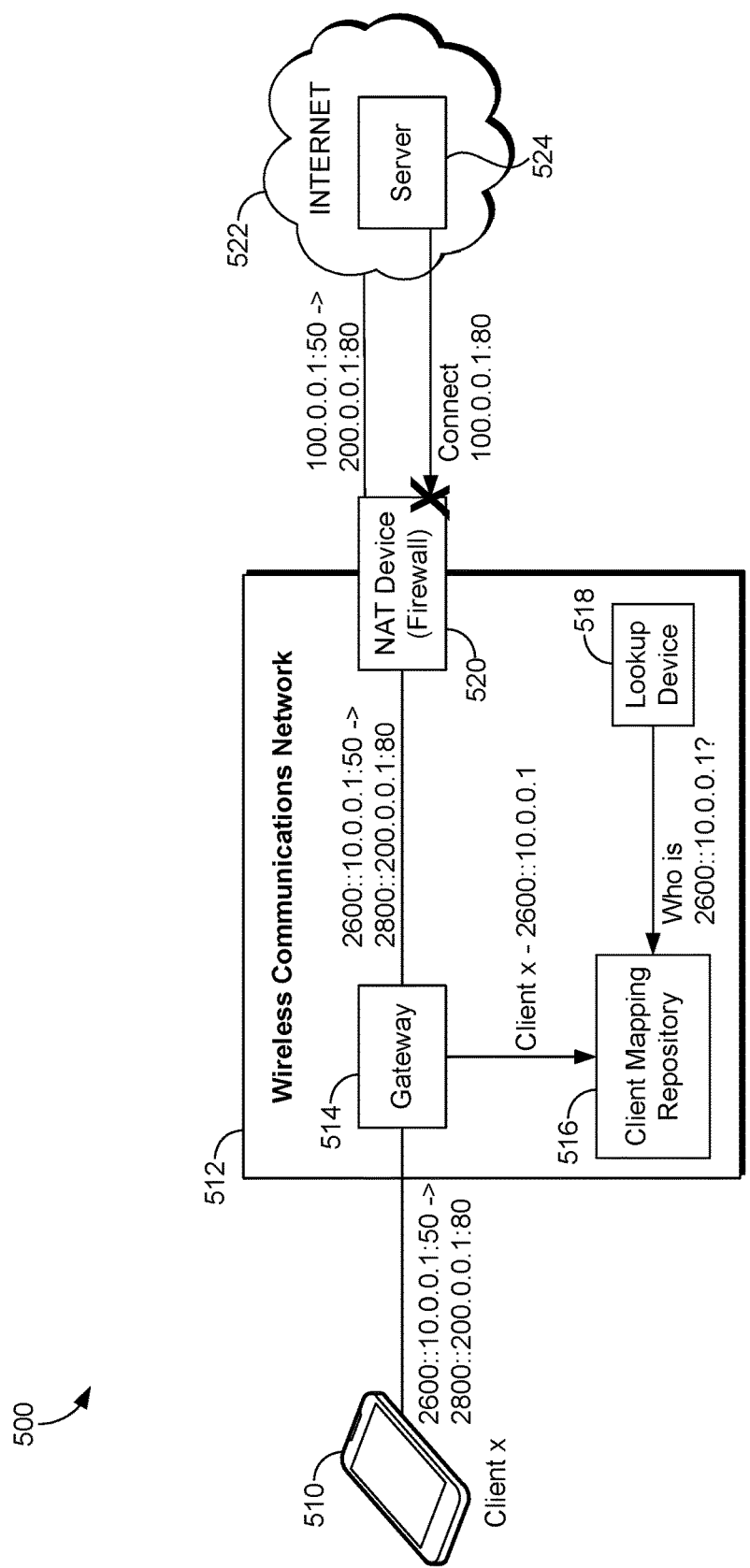

Turning now to FIGS. 3-5, exemplary communication flows 300, 400, 500 are depicted to illustrate various embodiments of the technology, in accordance with aspects described herein. In FIG. 3, a wireless communications network 312 is illustrated that is similar to the wireless communications network 212 described above with respect to FIG. 2. The client device 310 may have an IPv4 internal IP address (e.g., 10.0.0.1) that is assigned by gateway 314 and stored in client mapping repository 316. When the client device 310 attempts to communicate with an external device (e.g., server 324 having an IP address of 200.0.0.1) via the internet 322, the NAT device 320 provides the client device an external IP address (e.g., 100.0.0.1). This external IP address (e.g., 100.0.0.1) may be shared by any number of client devices in the wireless communications network 312. Accordingly, attempts by the external device to identify the client device utilizing the external IP address will be unsuccessful.

To overcome this, the NAT device 320 also communicates the internal IP address of the client device in the option field of the external IP address. So if the external device needs to identify the client (such as for customizing a particular website or service for a particular user), the external device can request information associated with the user by requesting from the lookup device 318 and/or client mapping repository 316 the identity of the user associated with the internal IP address.

In FIG. 4, a wireless communications network 412 is illustrated that is similar to the wireless communications network 212 and wireless communications network 312 described above with respect to FIGS. 2 and 3. The client device 410 may have an IPv6 internal IP address (e.g., 2600::10.0.0.1) that is assigned by gateway 414 and stored in client mapping repository 416. When the client device 410 attempts to communicate with an external device (e.g., server 424 having an IP address of 2800::200.0.0.1) via the internet 422, the first NAT device 420a provides the client device an external IP address (e.g., 100.0.0.1). This external IP address (e.g., 100.0.0.1) may be shared by any number of client devices in the wireless communications network 412. Suppose the connection fails or otherwise ends and upon a second communication attempt by the client device 410 with the external device is routed to a second NAT device 420b. Because the second NAT device in unaware of the external IP address assigned by the first NAT device 420A, the second NAT device 420b provides the client device with a different external IP address (e.g., 150.0.0.1). Accordingly, the external device is unaware that the same client device is attempting to communicate with the external device utilizing a different external IP address.

To overcome this, each of the NAT devices 420a, 420b also communicates the internal IP address of the client device in the option field of each corresponding external IP address. So if the external device needs to identify the client (such as for customizing a particular website or service for a particular user), the external device can request information associated with the user by requesting from the lookup device 418 and/or client mapping repository 416 the identity of the user associated with the internal IP address.

In FIG. 5, a wireless communications network 512 is illustrated that is similar to the wireless communications networks 212, 312, 412 described above with respect to FIGS. 2-4. The client device 510 may have an IPv6 internal IP address (e.g., 2600::10.0.0.1) that is assigned by gateway 514 and stored in client mapping repository 516. When the client device 510 attempts to communicate with an external device (e.g., server 524 having an IP address of 2800:: 200.0.0.1) via the internet 522, the NAT device 520 provides the client device an external IP address (e.g., 100.0.0.1). This external IP address (e.g., 100.0.0.1) may be shared by any number of client devices in the wireless communications network 512. Accordingly, attempts by the external device to initiate communication with the client device utilizing the external IP address will be unsuccessful (e.g., a service such as SKYPE where a user may wish for the service to be able to initiate communication with the client device).

To overcome this, the NAT device 520 also communicates the internal IP address of the client device in the option field of the external IP address. So when the external device 524 needs to initiate communicate with the client device 510, the external device 524 can communicate a request to the NAT device 520 and include the internal IP address of the client device 510 in the option field of the external IP address. The internal IP address may be communicated to the lookup device 518 and/or client mapping repository 516 to identify the client associated with the internal IP address. Once the client is identified, the request can be communicated to the appropriate client device 510.

Referring now to FIG. 6, a flow chart is illustrated of an exemplary method 600 of identifying, to an external device, a client device having an external IP address assigned by a NAT device, in accordance with an aspect herein. At block 610 of FIG. 6, a request is received from a client device, at a NAT device, to access an external device. The NAT device provides, at block 612, an external IP address assigned to the client to access the external device. In some embodiments, the external device is capable of IPv4. In this case, the external IP address assigned to the client device is an IPv4 address. In some embodiments, the external device is capable of IPv6. In this case, the external IP address assigned to the client device is an Ipv6 address. Additionally, the NAT device communicates, at block 614, an internal IP address assigned to the client device in an option field of the external IP address.

In some embodiments, the NAT device receives a request from the external device to communicate with the client device. The request may include the internal IP address assigned to the client device. Upon determining there are no sessions currently mapped to the client device, a new connection to the client device may be opened by the NAT device, allowing the external device to communicate with the client device.

In some embodiments, an identification of the client device is provided to a client mapping repository. When a request for an identification of the client device is received at the client mapping repository, such as from an external device, the identification of the client device may be communicated from the client mapping repository.

In some cases, the connection between the client device and the external device may no longer be active. In this instance, a second external IP address may be provided by the NAT device and assigned to the client device to access the external device. The NAT device may additionally communicate the internal IP address assigned to the client device in the option field of the external IP address. The second request includes the internal IP address assigned to the client device. If the external device issues a second request to the NAT device to communicate with the client device, the NAT device may forward the request to the client mapping repository for the identification of the client device. Accordingly, the client mapping repository communicates the identification of the client device.

Referring now to FIG. 7, a flow chart is illustrated of an exemplary method 700 of identifying, to an external device, a client device having an external IP address assigned by a NAT device, in accordance with an aspect herein. At block 710 of FIG. 7, a request is received from an external device, at a NAT device in a Pre-NAT environment, for an identification of a client device. The request includes an internal IP address in the option field of an external IP address assigned to the client device.

At block 712, the request is received, at a client mapping repository in the Pre-NAT environment, for the identification of the client device. The identification of the client device is communicated, at block 714, from the client mapping repository to the external device, the identification of the client device.

In some embodiments, a request is received, at the NAT device, from the client device to access the external device. The request may include the internal IP address assigned to the client device. The external IP address assigned to the client to access the external device is provided by the NAT device. The internal IP address assigned to the client device is also communicated by the NAT device in the option field of the external IP address.

In some embodiments, the NAT device checks for any sessions mapping (the external device) to the client device. Upon determining there are no sessions mapped to the client device, the NAT device opens a new connection to the client device. A second external IP address assigned to the client to access the external device may be provided by the NAT device. The NAT device may additionally communicate the internal IP address assigned to the client device in the option field of the external IP address.

In some embodiments, the NAT device receives a second request from the external device to communicate with the client device. The second request may include the internal IP address assigned to the client device. The second request is communicated by the NAT device to the client mapping repository for the identification of the client device. The client mapping repository communicates the identification of the client device.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

What is claimed is:

1. A computerized method carried out by at least one server having one or more processors for identifying, to an external device, a client device having an external IP address assigned by a Network Address Translation (NAT) device, the method comprising:
   receiving, at a NAT device, a request from a client device to access an external device;
   providing, by the NAT device, an external IP address assigned to the client to access the external device;
   communicating, by the NAT device, an internal IP address assigned to the client device and placed in an option field of the external IP address;
   providing, by the NAT device, a second external IP address assigned to the client to access the external device;
   communicating, by the NAT device, the internal IP address assigned to the client device in the option field of the external IP address;
   receiving, at the NAT device, a second request from the external device to communicate with the client device, the second request including the internal IP address assigned to the client device;
   receiving the second request, at the client mapping repository, for the identification of the client device; and
   communicating, from the client mapping repository, the identification of the client device.

2. The method of claim 1, further comprising receiving, at the NAT device, a request from the external device to communicate with the client device.

3. The method of claim 2, wherein the request includes the internal IP address assigned to the client device.

4. The method of claim 3, further comprising checking for any sessions mapping to the client device.

5. The method of claim 4, further comprising, upon determining there are no sessions mapped to the client device, opening a new connection to the client device.

6. The method of claim 1, further comprising receiving a request, at a client mapping repository, for an identification of the client device.

7. The method of claim 6, further comprising communicating, from the client mapping repository, the identification of the client device.

8. The method of claim 1, further comprising providing, an identification of the client device to a client mapping repository.

9. The method of claim 1, wherein the external device is capable of 1Pv4.

10. The method of claim 9, wherein the external IP address assigned to the client device is an IPv4 address.

11. The method of claim 1, wherein the external device is capable of IPv6.

12. The method of claim 11, wherein the external IP address assigned to the client device is an IPv6 address.

13. One or more computer-readable media having computer-executable instructions embodied thereon that, when executed, perform a method of identifying, to an external device, a client device having an external IP address assigned by a Network Address Translation (NAT) device, the method comprising:
   receiving a request, at a NAT device in a wireless communications network, from an external device, for an identification of a client device, the request including an internal IP address in the option field of an external IP address assigned to the client device;
   receiving the request, at a client mapping repository in the wireless communications network, for the identification of the client device;
   communicating, from the client mapping repository to the external device, the identification of the client device;
   providing, by the NAT device, a second external IP address assigned to the client to access the external device;
   communicating, by the NAT device, the internal IP address assigned to the client device in the option field of the external IP address;
   receiving, at the NAT device, a second request from the external device to communicate with the client device, the second request including the internal IP address assigned to the client device
   receiving the second request, at the client mapping repository, for the identification of the client device; and
   communicating, from the client mapping repository, the identification of the client device.

14. The one or more computer-readable media of claim 13, further comprising
   receiving, at the NAT device, a request from the client device to access the external device, wherein the request includes the internal IP address assigned to the client device;
   providing, by the NAT device, the external IP address assigned to the client to access the external device; and
   communicating, by the NAT device, the internal IP address assigned to the client device in the option field of the external IP address.

15. The one or more computer-readable media of claim 13, further comprising:
   comprising checking for any sessions mapping to the client device; and
   upon determining there are no sessions mapped to the client device, opening a new connection to the client device.

16. A system for identifying, to an external device, a client device having an external IP address assigned by a Network Address Translation (NAT) device, the system comprising:
   a processor; and
   one or more computer-readable media storing computer-useable instructions that, when used by the processor, cause the processor to:
   upon receiving a first request from an external device to communicate with a client device, provide, by the NAT device to the user device, a first external IP address assigned to the client device to access the external device;
   upon the client device communicating with the external device, provide by the NAT device, an internal IP address assigned to the client device and placed in an option field of the first external IP address;
   upon receiving a second request from the external device to communicate with the client device, the second request including the internal IP address in the option field of the external IP address assigned to the client device, checking for any sessions at the NAT device mapping to the client device;
   upon determining there are no sessions mapped to the client device, opening a new connection to the client device;
   providing, by the NAT device, a second external IP address assigned to the client to access the external device;
   communicating, by the NAT device, the internal IP address assigned to the client device in the option field of the second external IP address;
   receiving the second request, at the client mapping repository, for the identification of the client device; and
   communicating, from the client mapping repository, the identification of the client device.

* * * * *